(12) United States Patent
Jakobitz

(10) Patent No.: US 9,639,568 B2
(45) Date of Patent: May 2, 2017

(54) SYSTEMS AND METHODS FOR IMPROVED DATA STRUCTURE STORAGE

(71) Applicant: Eddie Lloyd Jakobitz, Johnstown, CO (US)

(72) Inventor: Eddie Lloyd Jakobitz, Johnstown, CO (US)

(73) Assignee: AKTIEBOLAGET SKF, Gothenburg (SE)

( * ) Notice: Subject to any disclaimer, the term of this patent is extended or adjusted under 35 U.S.C. 154(b) by 377 days.

(21) Appl. No.: 14/266,883

(22) Filed: May 1, 2014

(65) Prior Publication Data

US 2015/0317346 A1    Nov. 5, 2015

(51) Int. Cl.
*G06F 7/00* (2006.01)
*G06F 17/30* (2006.01)

(52) U.S. Cl.
CPC .. *G06F 17/30345* (2013.01); *G06F 17/30289* (2013.01); *G06F 17/30339* (2013.01); *G06F 17/30864* (2013.01)

(58) Field of Classification Search
None
See application file for complete search history.

(56) References Cited

U.S. PATENT DOCUMENTS

| | | | | |
|---|---|---|---|---|
| 8,065,320 B2 * | 11/2011 | Sedlar | ............... | G06F 17/30233 |
| | | | | 707/769 |
| 2004/0078355 A1 * | 4/2004 | Suresh | ............. | G06F 17/30569 |
| 2006/0064425 A1 * | 3/2006 | Kakivaya | .......... | G06F 17/30595 |
| 2006/0235820 A1 | 10/2006 | Hoth et al. | | |
| 2008/0154918 A1 | 6/2008 | Iwatsu et al. | | |
| 2008/0281801 A1 * | 11/2008 | Larson | ............... | G06F 17/30595 |
| 2010/0125579 A1 * | 5/2010 | Pardoe | .............. | G06F 17/30917 |
| | | | | 707/736 |
| 2011/0078199 A1 | 3/2011 | Williamson | | |
| 2012/0078942 A1 * | 3/2012 | Cai | ................... | G06F 17/30424 |
| | | | | 707/769 |
| 2012/0117116 A1 * | 5/2012 | Jacobson | .......... | G06F 17/30657 |
| | | | | 707/792 |

FOREIGN PATENT DOCUMENTS

WO        2013174452 A1    11/2013

* cited by examiner

*Primary Examiner* — Tuan A Pham
(74) *Attorney, Agent, or Firm* — Bryan Peckjian; SKF USA Inc. Patent Dept.

(57) ABSTRACT

A system and method for storing, reading, and updating data structures in a database. The system and method can include storing an entry in a structure table for each data structure, where each data structure is associated with a unique identifier. The system and method can also include storing an entry for each field of a data structure in n field table corresponding to a data type of the field, where the entry for each field is associated with the unique identifier of the data structure. A field for a data structure can be accessed by searching the appropriate field table for the unique identifier of the data structure. Additionally, the data structure can be updated by adding a new entry in the structure table and new entries in the field tables.

17 Claims, 6 Drawing Sheets

| ID | NAME | MODIFIEDDATE | |
|---|---|---|---|
| A64A3 | LIMITENTRY | 2014-14-04 23:45:54 | 100 |

| NAME | PARENTID | VALUE | ARRAYINDEX | |
|---|---|---|---|---|
| ID | A64A3 | F3848C | NULL | 110 |
| NAME | A64A3 | My Test Limit | NULL | |

| NAME | PARENTID | VALUE | ARRAYINDEX | |
|---|---|---|---|---|
| DELTAR | A64A3 | 50 | NULL | |
| LLEAR | A64A3 | 100 | NULL | 120 |
| PPEAR | A64A3 | 25 | NULL | |
| MINMOHM | A64A3 | 10 | NULL | |

FIG. 1

| ID | NAME | MODIFIEDDATE |
|---|---|---|
| A64A3 | LIMITENTRY | 2014-14-04 23:45:54 |
| CC4AD | LIMITENTRY | 2014-15-04 20:43:34 |
| 3DFEA | ARRAYENTRY | 2014-15-04 21:34:23 |

500

| NAME | PARENTID | VALUE | ARRAYINDEX |
|---|---|---|---|
| ID | A64A3 | F3848C | NULL |
| NAME | A64A3 | My Test Limit | NULL |
| ID | CC4AD | A249F | NULL |
| NAME | CC4AD | Second Limit Added | NULL |
| ID | 3DFEA | D34FG | NULL |
| NAME | 3DFEA | My Array | NULL |

510

| NAME | PARENTID | VALUE | ARRAYINDEX |
|---|---|---|---|
| DELTAR | A64A3 | 50 | NULL |
| LLEAR | A64A3 | 100 | NULL |
| PPEAR | A64A3 | 25 | NULL |
| MINMOHM | A64A3 | 10 | NULL |
| DELTAR | CC4AD | 50 | NULL |
| LLEAR | CC4AD | 100 | NULL |
| PPEAR | CC4AD | 25 | NULL |
| MAXMOHM | CC4AD | 0 | NULL |
| ARRAY | 3DFEA | 5 | 0 |
| ARRAY | 3DFEA | 39 | 1 |
| ARRAY | 3DFEA | 3 | 2 |

SYSTEMS AND METHODS FOR IMPROVED DATA STRUCTURE STORAGE

TECHNICAL FIELD

The present disclosure relates generally to methods, systems, and computer-readable media for storing data structures in a database.

BACKGROUND

Traditional database methods utilize a direct mapping between a database schema and data structures stored in the database. In such methods, a given data structure may be stored as a single row in a database table, and the columns of the database table will need to match the data types within the data structure.

For example, a database could be configured to store a data structure that includes a string data type and an integer data type. The database would include a table with each instance of the data structure stored as a row in the table. Accordingly, the table would have to have at least one column configured to store strings, and at least one column configured to store integers.

A problem with this method is that a change to the data structure would require a change to the database table. For example, if an upgrade to the application changes the data types of fields in the data structure, then the database will need to be updated and will no longer be compatible with older versions of the data structure prior to the update.

Accordingly, database technologies may benefit from improved techniques of storing data structures in a database.

SUMMARY

The present disclosure relates generally to methods, systems, and computer readable media for providing these and other improvements to database technologies.

Implementations of the present teachings relate to methods for storing data structures in a database. In some embodiments, a computing device can receive instructions to store a data structure in a database, where the data structure includes at least one field. The computing device can add an entry in a structure table of the database, and the entry can include a unique identifier of the data structure. The computing device can also add an entry in a field table of the database, where the field table corresponds to a data type of the field, and the entry includes the unique identifier of the data structure and a value of the field.

Implementations of the present teachings relate to computer systems for storing data structures in a database, the systems include one or more memory devices storing instructions, and one or more processors coupled to the one or more memory devices. The one or more processors are configured to execute the instructions to perform methods and operations. The methods and operations include receiving instructions to store a data structure in a database, where the data structure includes at least one field; adding an entry in a structure table of the database, where the entry includes a unique identifier of the data structure; adding an entry in a field table of the database, where the field table corresponds to a data type of the field and the entry includes the unique identifier of the data structure and a value of the field.

Implementations of the present teachings also relate to computer readable storage media storing instructions. The instructions cause one or more processors to perform methods and operations for storing data structures in a database. The methods and operations include receiving instructions to store a data structure in a database, where the data structure includes at least one field; adding an entry in a structure table of the database, where the entry includes a unique identifier of the data structure; adding an entry in a field table of the database, where the field table corresponds to a data type of the field and the entry includes the unique identifier of the data structure and a value of the field.

It will be appreciated that the foregoing summary is intended merely to introduce certain aspects of the disclosure. These and other aspects are more fully described below. As such, this summary is not intended to be limiting on the claims.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings:

FIG. 1 is a diagram depicting a schematic of an exemplary database, consistent with certain disclosed embodiments;

FIG. 5 is a diagram depicting a schematic of an exemplary database, consistent with certain disclosed embodiments.

DETAILED DESCRIPTION

Figure 2:
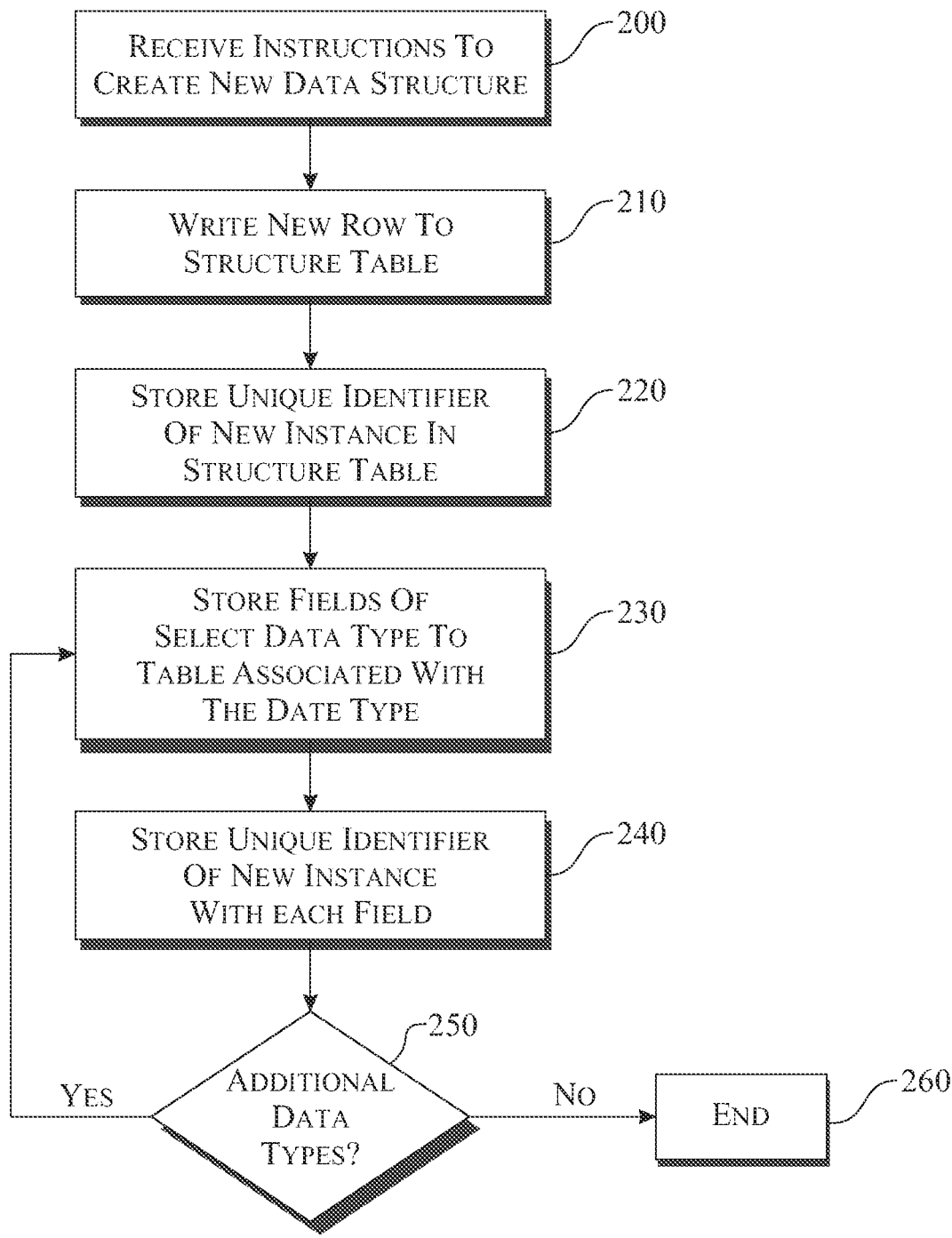
FIG. 2 is a flow diagram illustrating an exemplary method of saving a new data structure, consistent with certain disclosed embodiments.

The following detailed description refers to the accompanying drawings. Wherever possible, the same reference numbers are used in the drawings and the following description refers to the same or similar parts. While several exemplary embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

FIG. 1 is a diagram depicting a schematic of an exemplary database, consistent with certain disclosed embodiments. In particular, FIG. 1 depicts a structure table 100, a string table 110, and an integer table 120, that can, in some embodiments, be included in a single database.

Structure table 100 can include a row for each data structure stored in the database. As used herein, reference to a "data structure" may refer to an instance of a particular type of data structure. For example, a database may have multiple instances of a particular type of data structure (e.g. LIMITENTRY) stored thereon, and, in some embodiments, the multiple instances may include different versions of the type of data structure.

Additionally, for each data structure, structure table 100 can include an ID column and a NAME column. The ID column can be used to store a unique identifier for each data structure and/or each instance of the same type of data structure stored in the database. The NAME column can be used to store an identifier for the type of data structure stored.

In the example shown in FIG. 1, a single data structure is stored in structure table 100. The type of data structure is LIMITENTRY and the unique identifier for the data structure is A64A3. Structure table 100 additionally may include a MODIFIEDDATE column to identify a date and time timestamp of when each entry was last modified.

String table 110 can include a row for each field stored in the database that is a string data type. Additionally, for each field, string table 110 can include a NAME column, a PARENTID column, and a VALUE column. The NAME column can be used to store an identifier of the field. The PARENTID column can be used to store the unique identifier of the data structure associated with the field. The VALUE column can be used to store the value of the field. For string table 110, the VALUE column can be configured to store strings.

In the example shown in FIG. 1, two fields are stored in string table 110. The identifier of the first field stored is ID and the value of the first field is the string "F3848C." The identifier of the second field stored is NAME and the value of the second field is the string "My test limit." Both fields are associated with a data structure associated with the unique identifier A64A3, which is a LIMITENTRY type of data structure, as identified in structure table 100. String table 110 additionally may include an ARRAYINDEX column to identify an array position of each field, if applicable. An example depicting use of the ARRAYINDEX column is described in further detail below.

Integer table 120 can include a row for each field stored in the database that is an integer data type. Additionally, for each field, integer table 120 can include a NAME column, a PARENTID column, and a VALUE column. The NAME column can be used to store an identifier of the field. The PARENTID column can be used to store the unique identifier of the data structure associated with the field. The VALUE column can be used to store the value of the field. For integer table 120, the VALUE column can be configured to store integers.

In the example shown in FIG. 1, four fields are stored in integer table 120. The identifier of the first field is DELTAR and the value of the first field is the integer "50." The identifier of the second field is LLEAR and the value of the second field is the integer "100." The identifier of the third field is PPEAR and the value of the third field is the integer "125." The identifier of the fourth field is MINMOHM and the value of the fourth field is the integer "10." All four fields are associated with a data structure associated with the unique identifier A64A3, which is a LIMITENTRY type of data structure, as identified in structure table 100. Integer table 120 additionally may include an ARRAYINDEX column to identify an array position of each field, if applicable.

The example depicted in FIG. 1 is merely for the purpose of illustration, and is not intended to be limiting. For example, structure tables may not include a MODIFIEDDATE column and/or may include additional columns. Additionally, the column names may be different or may not be stored in the database. Further, string table 110 and integer table 120 represent examples of field tables that can be used, consistent with certain disclosed embodiments, but such examples are not intended to be limiting. In some embodiments, field tables for storing other data types, such as strings, Boolean values, abstract data types, composite data types, object types, etc., can be utilized. Additionally, each field table may include similar columns or may include unique columns specific to the field table.

FIG. 2 is a flow diagram illustrating an exemplary method of saving a new data structure, consistent with certain disclosed embodiments. In some embodiments, the steps of FIG. 2 can be performed by an interface between an application and a database. Accordingly, an update to the application may not affect the operation/structure of the database, and an update to the database may not affect the operation/structure of the application.

The process can begin in 200 when a computing device receives instructions to create, store, and/or save a new data structure. For example, the instructions may be received from an application on the same computing device or from a remote computing device. In some embodiments, the computing device can additionally receive fields to be stored with the new data structure, while, in further embodiments, the computing device can generate and/or retrieve the fields based on the instructions.

In 210, the computing device can write a new row to a structure table. In some embodiments, the computing device can generate a unique identifier for the new row, while, in further embodiments, the computing device can receive a unique identifier associated with the new data structure along with the instructions. Additionally, in some embodiments, the computing device can receive a name associated with the data structure along with the instructions, while, in further embodiments, the computing device can determine the name associated with the data structure. In some implementations, the name of the data structure can correspond to the data structure type of the data structure.

In 220, the computing device can store the unique identifier and the name as columns in the new row of the structure table.

In 230, the computing device can store each field of a first data type in a table associated with the first data type. For example, if the fields to be stored with the new data structure include one or more integer fields, the computing device can store each integer field as a new row in an integer table. The value of the field can be stored in a column of the integer table configured to store integers.

In 240, the computing device can store the unique identifier associated with the new data structure in a column of the table associated with the first data type.

If, in 250, there are fields of additional data types to be stored, the computing device proceeds to 230 to store each field of each subsequent data type in a table associated with the subsequent data type. For example, if the fields to be stored with the new data structure include character fields, string fields, object fields, etc., the computing device can store each field as a new row in a corresponding table. The value of each field can be stored in a column of the corresponding table configured to store the data type of the field.

In 240, the computing device can store the unique identifier associated with the new data structure in a column of the table associated with each subsequent data type.

If, in 250, there are no additional fields of additional data types to be stored, the process can end in 260.

While the steps depicted in FIG. 2 have been described as performed in a particular order, the order described is merely exemplary, and various different sequences of steps can be performed, consistent with certain disclosed embodiments. Additionally, the steps are described as discrete steps merely for the purpose of explanation, and, in some embodiments, multiple steps may be performed simultaneously and/or as part of a single computation. Further, the steps described are not intended to be exhaustive or absolute, and various steps can be inserted or removed.

Figure 3:
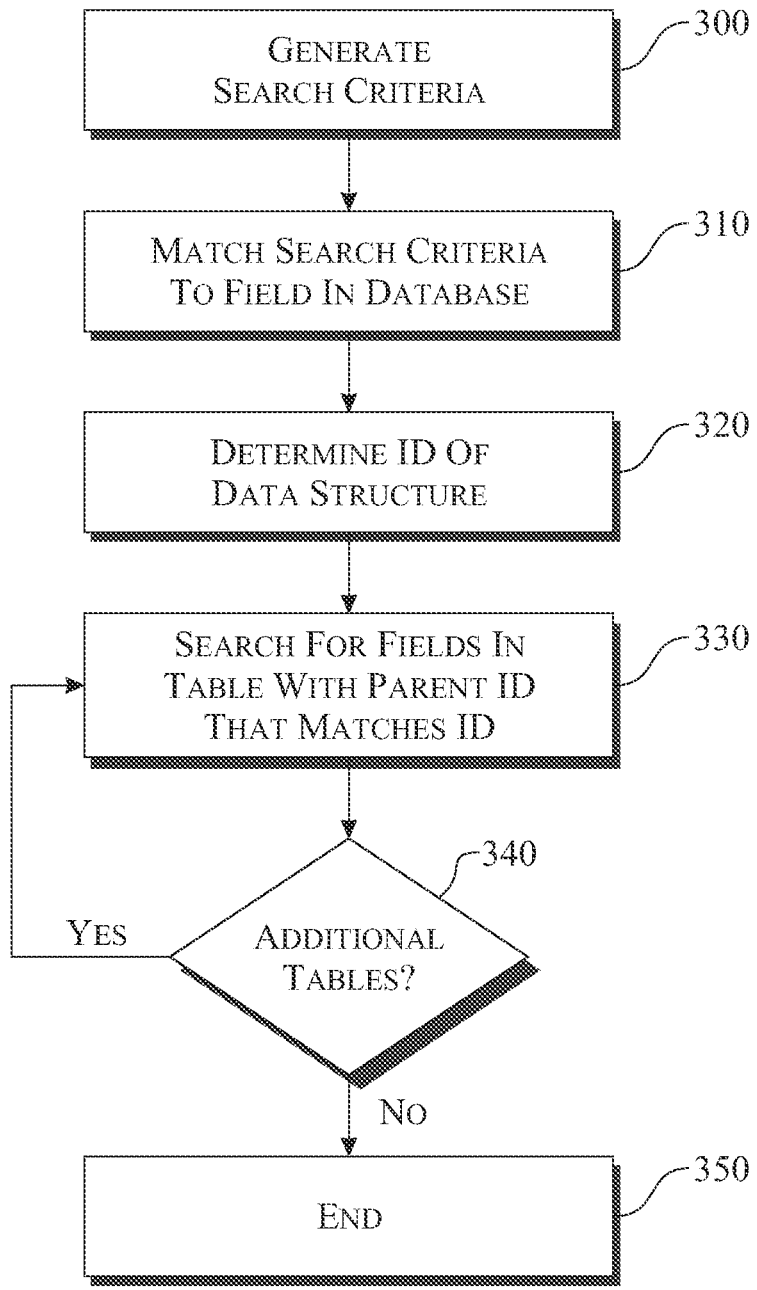
FIG. 3 is a flow diagram illustrating an exemplary method of reading data stored in a data structure, consistent with certain disclosed embodiments.

FIG. 3 is a flow diagram illustrating an exemplary method of reading data stored in a data structure, consistent with certain disclosed embodiments. In some embodiments, the steps of FIG. 3 can be performed by an interface between an application and a database. Accordingly, an update to the application may not affect the operation/structure of the database, and an update to the database may not affect the operation/structure of the application.

The process can begin in 300 when a computing device generates a search criteria for one or more fields stored in a data structure.

In some embodiments, the search criteria may be generated by the computing device based on a read request from an application. For example, the request may be received from an application on the same computing device or from a remote computing device.

The application may request one or more fields of a data structure associated with an identification field with a specified value (e.g. a specified name, a specified integer, etc.). As used here, an "identification field" can refer to a field that is used to search for a data structure in a database.

The generated search criteria can include the type of data structure to search for (e.g. LIMITENTRY), the data type of the identification field (e.g. string), the name of the identification field (e.g. ID), the value of the identification field, as well as any database instructions for the search. The database instructions may include, for example, instructions to search for values that are equal, greater than, less than, etc., and/or can include any other type of database commands.

Based on the request from the application, the computing device can generate the search criteria to retrieve, in some embodiments, the entire data structure or, in other embodiments, part of the data structure from the database.

In 310, the computing device can match the search criteria to a field in the database. In some embodiments, the computing device may use the data type of the identification field to identify the appropriate field table, and search the field table for the identification field by matching, for example, the value and/or the name of a field in the field table with the identification field.

Once a field in the field table is matched to the identification field, in 320, the computing device can determine the unique identifier for the data structure associated with the field (e.g. in the PARENTID column).

In 330, the computing device can search a first table associated with a first data type for fields that include the unique identifier. In some embodiments, the computing device can search each field table in the database. In other embodiments, the computing device can identify the data types of fields in the data structure and only search tables associated with the identified data types. In further embodiments, the request can include the fields and the data types of the fields to be searched, and the computing device may only search the tables associated with the data types of the fields to be searched.

The computing device can, in some embodiments, return the identified fields to the application or, in further embodiments, the computing device can add each identified field to a copy of the data structure that is formatted for, and can be returned to the application.

If, in 340, there are additional field tables to be searched, the computing device proceeds to 330 to search subsequent tables associated with subsequent data types for fields that include the unique identifier.

In 330, the computing device can search for fields in each subsequent table associated with the unique identifier in the table. The computing device can return the identified fields to the application or add each identified field to a copy of the data structure that is formatted for, and can be returned to the application.

If, in 340, there are no additional field tables to be searched because, in some embodiments, each table has been search or, in other embodiments, the specified fields have been returned, the process can end in 350. For example, the process can end by returning a copy of the data structure to the application that is formatted for the application.

While the steps depicted in FIG. 3 have been described as performed in a particular order, the order described is merely exemplary, and various different sequences of steps can be performed, consistent with certain disclosed embodiments. Additionally, the steps are described as discrete steps merely for the purpose of explanation, and, in some embodiments, multiple steps may be performed simultaneously and/or as part of a single computation. Further, the steps described are not intended to be exhaustive or absolute, and various steps can be inserted or removed.

Figure 4:
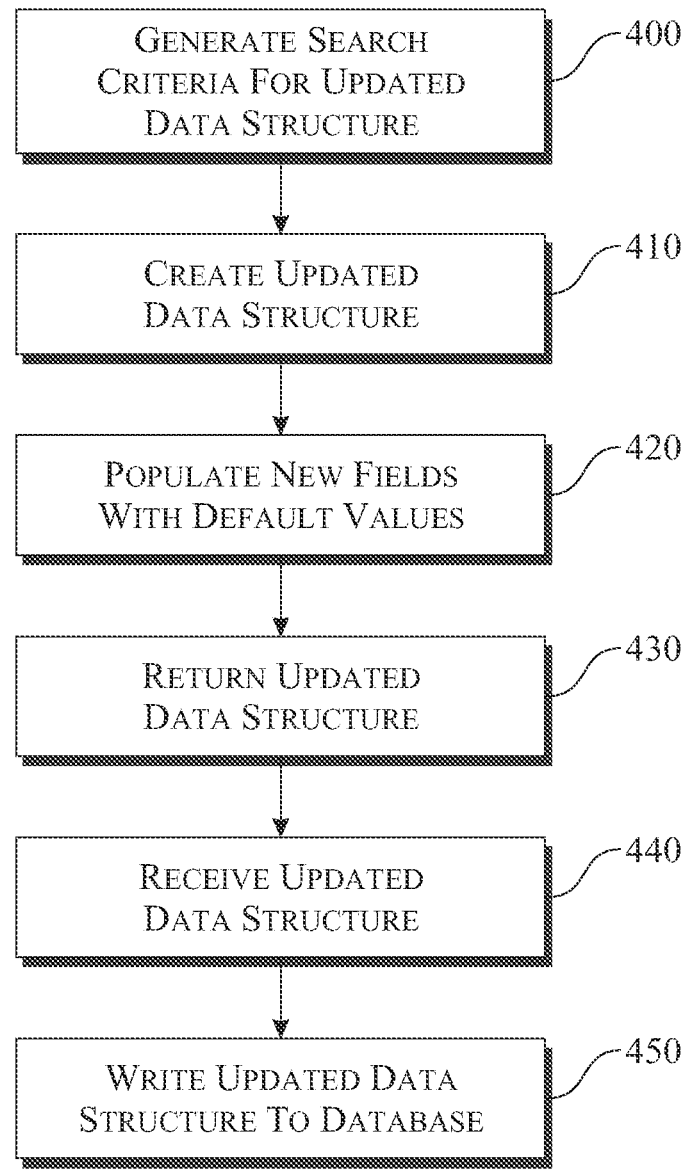
FIG. 4 is a flow diagram illustrating an exemplary method of updating a data structure in a database, consistent with certain disclosed embodiments.

FIG. 4 is a flow diagram illustrating an exemplary method of updating a data structure in a database, consistent with certain disclosed embodiments. In some embodiments, the steps of FIG. 4 can be performed by an interface between an application and a database. Accordingly, an update to the application may not affect the operation/structure of the database, and an update to the database may not affect the operation/structure of the application.

The process can begin in 400 when a computing device generates a search criteria for one or more fields stored in a data structure.

In some embodiments, the search criteria may be generated by the computing device based on a read request from an application. For example, the request may be received from an application on the same computing device or from a remote computing device.

For the example described in regard to FIG. 4, it can be assumed that the application has been updated prior to sending the read request. Accordingly, the application may require a data structure in a format that does not match the format of the data structure stored in the database.

In 410, the computing device can create a copy of the data structure by retrieving fields from the database, as described above in regard to FIG. 3. In some embodiments, because the format of the data structure required by the application is different than the format of the data structure stored in the database, the format of the data structure required by the application may include fields that were not stored in the database. Accordingly, in 420, the application can populate any missing fields with default values. Examples of default values can include, but are not limited to, null values for strings and objects; a zero value for integers and other number data types; and false for Boolean data types.

In 430, the computing device can format, if needed, and return the updated data structure to the application.

In 440, the computing device can receive the updated data structure from the application. In some embodiments, the application may have updated the values of one or more fields. In 450, the computing device can write the updated data structure to the database. For example, the computing device can write the updated data structure by saving a new data structure in the database with the fields and values of the updated data structure. The new data structure can be created as described in regard to FIG. 2.

In some implementations, the computing device can perform no action with regard to fields of the old data structure. The existence of the old fields will not affect the usage of the new fields for the updated data structure. Additionally, if the old data structure is required after the creation of the updated data structure, the fields of the old data structure can still be accessed using the unique identifier of the old data structure.

In other implementations, the computing device can find and remove all fields associated with the old data structure.

Additionally, in some embodiments, the updated data structure can be added to the database and, optionally, the fields of the old data structure can be deleted without first returning the old data structure, in updated format, to the application. Instead, instructions may be received to update the old data structure with the new data structure, and the computing device can simply write the updated data structure to the database and, optionally, delete the old data structure.

While the steps depicted in FIG. 4 have been described as performed in a particular order, the order described is merely exemplary, and various different sequences of steps can be performed, consistent with certain disclosed embodiments. Additionally, the steps are described as discrete steps merely for the purpose of explanation, and, in some embodiments, multiple steps may be performed simultaneously and/or as part of a single computation. Further, the steps described are not intended to be exhaustive or absolute, and various steps can be inserted or removed.

FIG. 5 is a diagram depicting a schematic of an exemplary database, consistent with certain disclosed embodiments. In particular, FIG. 5 depicts a structure table 500, a string table 510, and an integer table 520, that can, in some embodiments, be included in a single database.

Structure table 500 can include a row for each data structure stored in the database. Additionally, for each data structure, structure table 500 can include an ID column and a NAME column. The ID column can be used to store a unique identifier for each data structure stored in the database. The NAME column can be used to store an identifier for the type of data structure stored.

In the example shown in FIG. 5, a first instance of a LIMITENTRY data structure is stored in structure table 500. The unique identifier for the first instance of the LIMITENTRY data structure is A64A3. A second instance of the LIMITENTRY data structure is also stored in structure table 500. The unique identifier for the second instance of the LIMITENTRY data structure is CC4AD. The second instance of the LIMITENTRY data structure can represent an updated version of the LIMITENTRY data structure. An ARRAYENTRY data structure is also stored in structure table 500. The unique identifier for the ARRAYENTRY data structure is 3DFEA.

Structure table 500 additionally may include a MODIFIEDDATE column to identify a date and time timestamp of when each entry was last modified.

String table 510 can include a row for each field stored in the database that is a string data type. Additionally, for each field, string table 510 can include a NAME column, a PARENTID column, and a VALUE column. The NAME column can be used to store an identifier of the field. The PARENTID column can be used to store the unique identifier the data structure associated with the field. The VALUE column can be used to store the value of the field. For string table 510, the VALUE column can be configured to store strings.

In the example shown in FIG. 5, six fields are stored in string table 510. The identifier of the first field is ID and the value of the first field is the string "F3848C." The identifier of the second field is NAME and the value of the second field is the string "My test limit." Both fields are associated with the data structure associated with the unique identifier A64A3, which is a LIMITENTRY type of data structure, as identified in structure table 500.

The identifier of the third field is ID and the value of the third field is the string "A249F." The identifier of the fourth field is NAME and the value of the fourth field is the s string "Second limit added." Both fields are associated with a data structure associated with the unique identifier CC4AD, which is a LIMITENTRY type of data structure, as identified in structure table 500.

The identifier of the fifth field is ID and the value of the fifth field is the string "D34FG." The identifier of the sixth field is NAME and the value of the sixth field is the string "My array." Both fields are associated with a data structure associated with the unique identifier 3DFEA, which is an ARRAYENTRY type of data structure, as identified in structure table 500.

String table 510 additionally may include an ARRAYINDEX column to identify an array position of each field, if applicable.

Integer table 520 can include a row for each field stored in the database that is an integer data type. Additionally, for each field, integer table 520 can include a NAME column, a PARENTID column, and a VALUE column. The NAME column can be used to store an identifier of the field. The PARENTID column can be used to store the unique identifier of the data structure associated with the field. The VALUE column can be used to store the value of the field. For integer table 520, the VALUE column can be configured to store integers.

In the example shown in FIG. 5, eleven fields are stored in integer table 520. The identifier of the first field is DELTAR and the value of the first field is the integer "50." The identifier of the second field is LLEAR and the value of the second field is the integer "100." The identifier of the third field is PPEAR and the value of the third field is the integer "25." The identifier of the fourth field is MINMOHM and the value of the fourth field is the integer "10." All four fields are associated with a data structure associated with the unique identifier A64A3, which is a LIMITENTRY type of data structure, as identified in structure table 500.

The identifier of the fifth field is DELTAR and the value of the fifth field is the integer "50." The identifier of the sixth field is LLEAR and the value of the sixth field is the integer "100." The identifier of the seventh field is PPEAR and the value of the seventh field is the integer "25." The identifier of the eighth field is MAXMOHM and the value of the eighth field is the integer "0." All four fields are associated with data structure associated with the unique identifier CC4AD, which is a LIMITENTRY type of data structure, as identified in structure table 500.

Notably, the CC4AD LIMITENTRY data structure includes a field that is not included with the A64A3 LIMITENTRY data structure. The missing field associated with the CC4AD LIMITENTRY may correspond to a different version of a LIMITENTRY type of data structure.

Integer table 520 additionally may include an ARRAYINDEX column to identify an array position of each field, which is applicable to the ninth, tenth, and eleventh fields.

The identifier of the ninth field is ARRAY, the value of the ninth field is the integer "5," and the array index of the ninth field is 0. The identifier of the tenth field is ARRAY, the value of the tenth field is the integer "39," and the array index of the tenth field is 1. The identifier of the eleventh field is ARRAY, the value of the eleventh field is the integer "3," and the array index of the eleventh field is 2. All three fields are associated with a data structure associated with the unique identifier 3DFEA, which is an ARRAYENTRY type of data structure, as identified in structure table 500.

Accordingly, an array of integers is stored as the ninth, tenth, and eleventh fields in integer table 520. Each element can be accessed using the name of the field (ARRAY), the unique identifier of the data structure (3DFEA), and the array position.

The example depicted in FIG. 5 is merely for the purpose of illustration, and is not intended to be limiting. For example, structure tables may not include a MODIFIED-DATE column and/or may include additional columns. Additionally, the column names may be different or may not be stored in the database. Further, string table 510 and integer table 520 represent examples of field tables that can be used, consistent with certain disclosed embodiments, but such examples are not intended to be limiting. In some embodiments, field tables for storing other data types, such as strings, Boolean values, abstract data types, composite data types, object types, etc., can be utilized. Additionally, each field table may include similar columns or may include unique columns specific to the field table.

Implementations of any of the foregoing methods may be used in a measurement context, to name one example among many contemplated. For example, data may be measured from sensors of any type, at any rate, in a machine. The measurements may be stored using the data structure and processes discussed above, such that data of the integer type is stored in a row of a table, data of the floating point type may be stored in a row of a table, and data of the character (or string) data type may be stored in a row of a table, with a parent table organizing the various child, data-type specific tables. When the application performing aspects of the methods is updated, e.g., when the sensor array changes, the application may allow for updating the database by changing the rows of the child tables, e.g., on-the-fly, without a full reformatting of the database.

Figure 6:
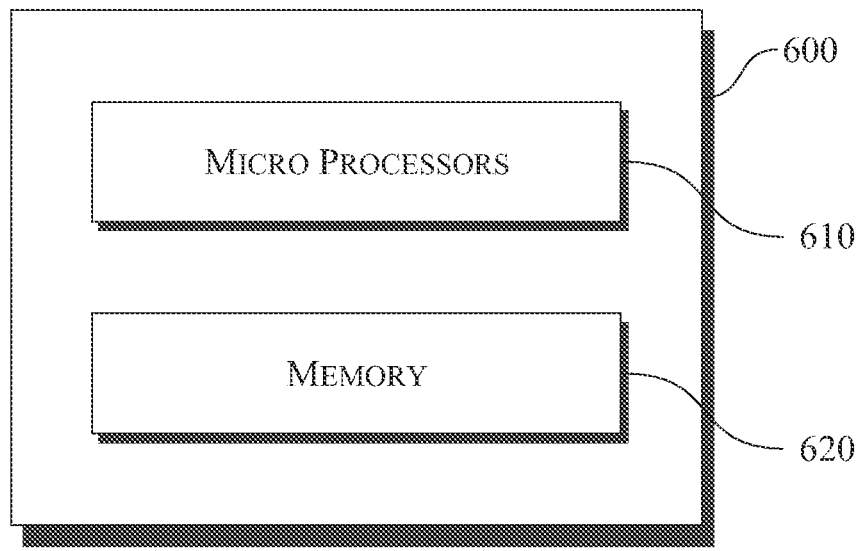
FIG. 6 is a diagram illustrating an exemplary hardware system for storing data structures in a database, consistent with certain disclosed embodiments.

FIG. 6 is a diagram illustrating an exemplary hardware system for storing data structures in a database, consistent with certain disclosed embodiments. Computing device 600 may represent any type of one or more computing devices.

Computing device 600 may include, for example, one or more microprocessors 610 of varying core configurations and clock frequencies; one or more memory devices or computer-readable media 620 of varying physical dimensions and storage capacities, such as flash drives, hard drives, random access memory, etc., for storing data, such as images, files, and program instructions for execution by one or more microprocessors 610; etc. One or more microprocessors 610, and one or more memory devices or computer-readable media 620 may be part of a single device as disclosed in FIG. 6 or may be contained within multiple devices. Those skilled in the art will appreciate that the above-described componentry is exemplary only, as computing device 600 may comprise any type of hardware componentry, including any necessary accompanying firmware or software, for performing the disclosed embodiments.

While the teachings has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method comprising:
    receiving instructions from a computer system hardware to store a data structure in a database, wherein the data structure comprises a first field and a second field:
        adding a first entry in a first table of the database, wherein the first entry in the first table comprises a unique identifier of the data structure;
    adding a second entry in a second table of the database, wherein:
        the second table corresponds to a data type of the first field, wherein the data type of the first field comprises a string data type;
        the second entry in the second table comprises the unique identifier of the data structure; and
    the second entry in the second table comprises a value of the first field; and
    adding a third entry in a third table of the database, wherein:
        the third table corresponds to a data type of the second field, wherein the data type of the second field comprises an integer data type;
        the third entry in the third table comprises the unique identifier of the data structure; and
        the third entry in the third table comprises a value of the second field;
    receiving a request to read an updated version of the data structure, wherein the request comprises the value of the first field;
    generating a search criteria based on the request;
    matching the search criteria to the second entry in the second table of the database;
    identifying the unique identifier of the data structure using the second entry in the second table;
    identifying the second field by searching the third table for the unique identifier;
    populating a missing field of the updated version of the data structure with a default value; and
    returning a copy of the updated version of the data structure comprising the first field, the second field, and the missing field.

2. The method of claim 1, wherein the data structure further comprises a third field, the method further comprising adding a fourth entry in the third table of the database, wherein:
    the third field is the same data type as the second field;
    the fourth entry in the third table comprises the unique identifier of the data structure; and the fourth entry in the third table comprises a value of the third field.

3. The method of claim 1, further comprising:
    receiving a request to read the data structure, wherein the request comprises the value of the first field;
    generating a search criteria based on the request;
    matching the search criteria to the second entry in the second table of the database;

identifying the unique identifier of the data structure using the second entry in the second table;
identifying the second field by searching the third table for the unique identifier;
and returning a copy of the data structure comprising the first field and the second field.

4. The method of claim 3, further comprising, before matching the search criteria to the second entry in the second table, identifying the second table based on the data type of the first field.

5. The method of claim 1, wherein the instructions to store the data structure and the request to read the updated version of the data structure are received from an application and are received by an interface between the application and the database.

6. The method of claim 5, wherein the application was updated, without updating the database, between a time that the instructions to store the data structure were received and a time that the request to read the updated version of the data structure was received.

7. The method of claim 1, further comprising generating the unique identifier of the data structure.

8. The method of claim 1, wherein:
the first field comprises an array of fields;
adding the second entry in the second table of the database comprises adding an entry into the second table for each field in the array; and
each entry added into the second table for each field in the array is associated with an index position of a corresponding field in the array.

9. The method of claim 1, wherein:
the first entry comprises an identifier for a type of the data structure;
the second entry comprises an identifier of the first field and an array position of the first field; and
the third entry comprises an identifier of the second field and an array position of the second field.

10. A system comprising:
a processing system comprising one or more hardware processors; and
a memory system comprising one or more computer-readable media, wherein the one or more computer-readable media contain instructions that, when executed by the processing system, cause the processing system to perform operations comprising:
receiving instructions to store a data structure in a database, wherein the data structure comprises a first field and a second field;
adding a first entry in a first table of the database, wherein the first entry in the first table comprises a unique identifier of the data structure;
adding a second entry in a second table of the database, wherein:
the second table corresponds to a data type of the first field, wherein the data type of the first field comprises a string data type;
the second entry in the second table comprises the unique identifier of the data structure; and
the second entry in the second table comprises a value of the first field; and adding a third entry in a third table of the database, wherein:
the third table corresponds to a data type of the second field, wherein the data type of the second field comprises an integer data type;
the third entry in the third table comprises the unique identifier of the data structure; and
the third entry in the third table comprises a value of the second field;
receiving a request to read an updated version of the data structure, wherein the request comprises the value of the first field;
generating a search criteria based on the request;
matching the search criteria to the second entry in the second table of the database; identifying the unique identifier of the data structure using the second entry in the second table;
identifying the second field by searching the third table for the unique identifier; populating a missing field of the updated version of the data structure with a default value; and
returning a copy of the updated version of the data structure comprising the first field, the second field, and the missing field.

11. The system of claim 10, wherein the data structure further comprises a third field, the operations further comprising adding a fourth entry in the third table of the database, wherein:
the third field is the same data type as the second field;
the fourth entry in the third table comprises the unique identifier of the data structure; and the fourth entry in the third table comprises a value of the third field.

12. The system of claim 10, the operations further comprising: receiving a request to read the data structure, wherein the request comprises the value of the first field;
generating a search criteria based on the request;
matching the search criteria to the second entry in the second table of the database;
identifying the unique identifier of the data structure using the second entry in the second table;
identifying the second field by searching the third table for the unique identifier; and returning a copy of the data structure comprising the first field and the second field.

13. The system of claim 12, the operations further comprising, before matching the search criteria to the second entry in the second table, identifying the second table based on the data type of the first field.

14. The system of claim 10, wherein:
the instructions to store the data structure and the request to read the updated version of the data structure are received from an application and are received by an interface between the application and the database; and
the application was updated, without updating the database, between a time that the instructions to store the data structure were received and a time that the request to read the updated version of the data structure was received.

15. The system of claim 10, the operations further comprising generating the unique identifier of the data structure.

16. The system of claim 10, wherein: the first field comprises an array of fields;
adding the second entry in the second table of the database comprises adding an entry into the second table for each field in the array; and
each entry added into the second table for each field in the array is associated with an index position of a corresponding field in the array.

17. A non-transitory computer-readable medium containing instructions embodied thereon, wherein the instructions, when executed by a processor, cause the processor to perform operations comprising:

receiving instructions to store a data structure in a database, wherein the data structure comprises a first field and a second field;

adding a first entry in a first table of the database, wherein the first entry in the first table comprises a unique identifier of the data structure;

adding a second entry in a second table of the database, wherein:

the second table corresponds to a data type of the first field, wherein the data type of the first field comprises a string data type;

the second entry in the second table comprises the unique identifier of the data structure; and the second entry in the second table comprises a value of the first field; and adding a third entry in a third table of the database, wherein:

the third table corresponds to a data type of the second field, wherein the data type of the second field comprises an integer data type;

the third entry in the third table comprises the unique identifier of the data structure; and the third entry in the third table comprises a value of the second field;

receiving a request to read an updated version of the data structure, wherein the request comprises the value of the first field;

generating a search criteria based on the request;

matching the search criteria to the second entry in the second table of the database;

identifying the unique identifier of the data structure using the second entry in the second table;

identifying the second field by searching the third table for the unique identifier;

populating a missing field of the updated version of the data structure with a default value; and returning a copy of the updated version of the data structure comprising the first field, the second field, and the missing field.

* * * * *